June 26, 1962  A. G. McNEILL  3,040,881
DISPLAY FOR EYEGLASSES
Filed Nov. 9, 1960
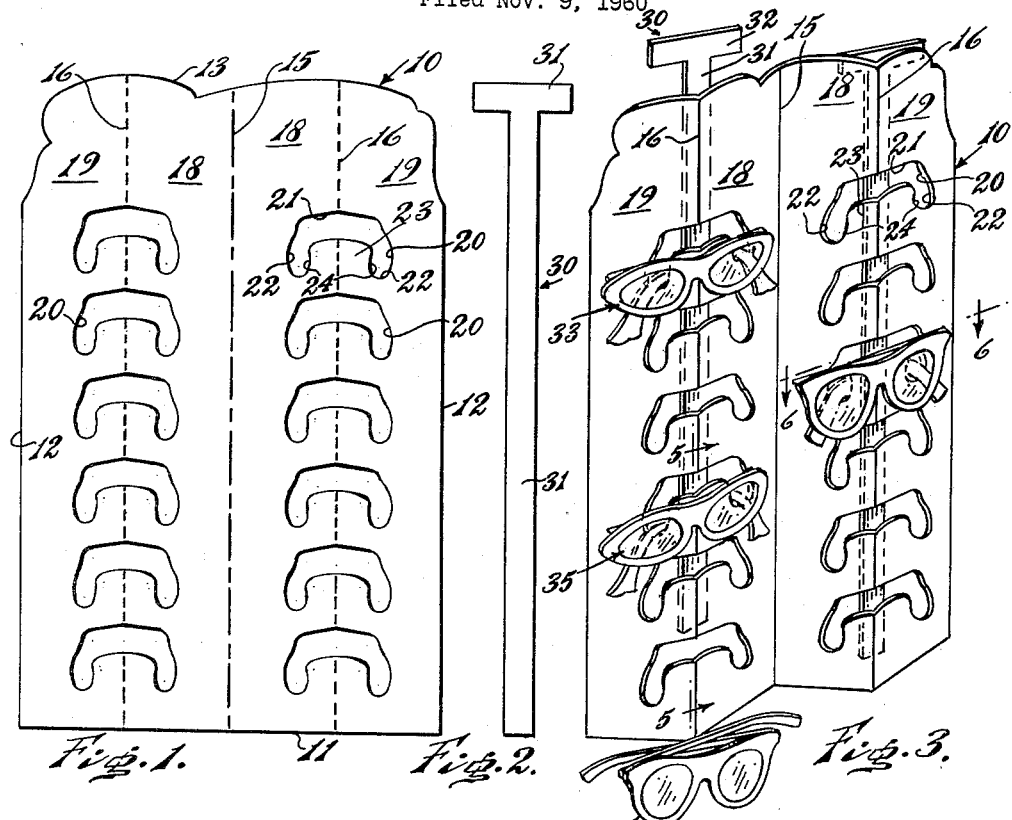
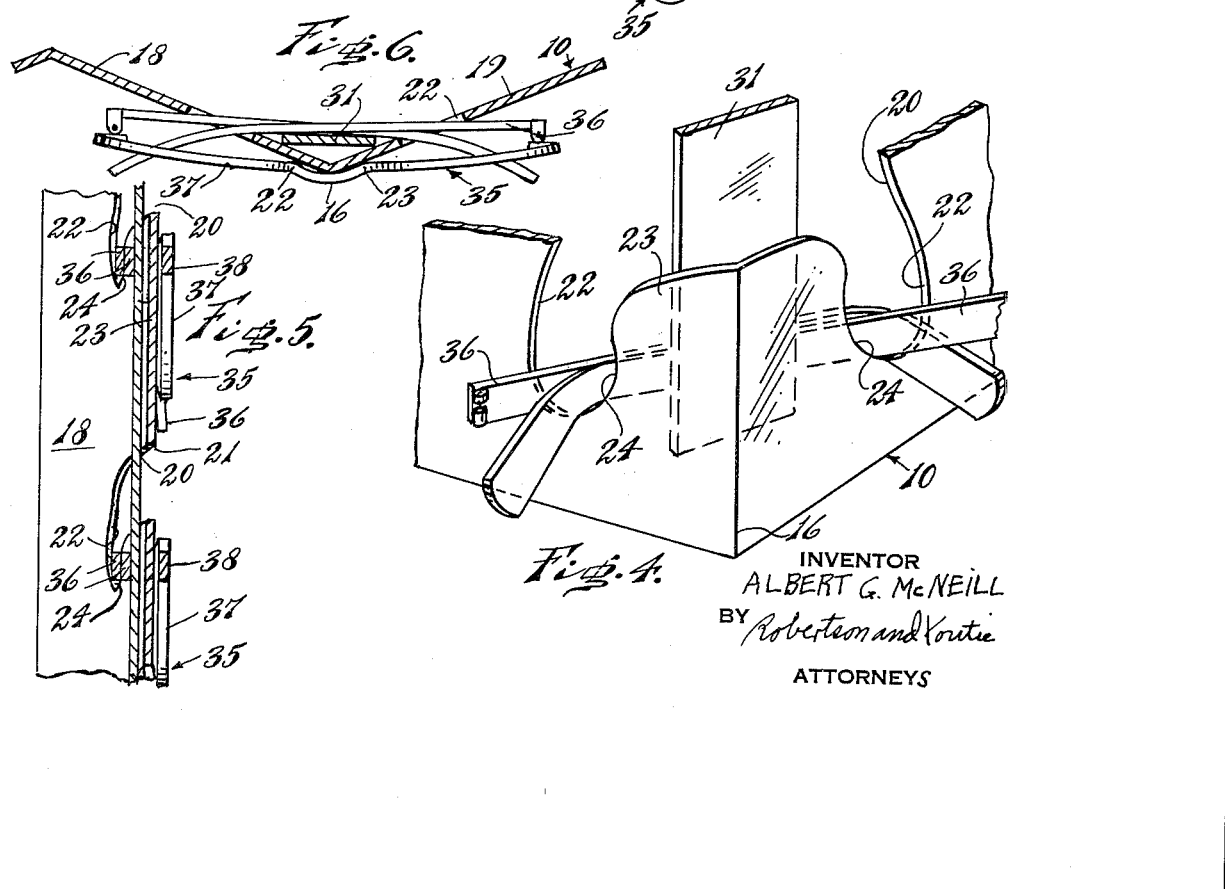
INVENTOR
ALBERT G. McNEILL
BY Robertson and Koutie
ATTORNEYS

United States Patent Office 3,040,881
Patented June 26, 1962

3,040,881
DISPLAY FOR EYEGLASSES
Albert G. McNeill, Maple Glen, Pa., assignor to Bachmann Bros., Inc., Philadelphia, Pa., a corporation of Pennsylvania
Filed Nov. 9, 1960, Ser. No. 68,234
4 Claims. (Cl. 206—80)

This invention relates generally to sales displays, and is especially concerned with a display device for eyeglasses.

It is one object of the present invention to provide a display device for eyeglasses adapted to be fabricated from a single flat sheet and to provide a neat, attractive and economical three-dimensional point-of-purchase display for eyeglasses.

It is a further object of the present invention to provide a sales display of the type described wherein a great number of eyeglasses may be simultaneously displayed and presented for convenient removal, as by a customer or salesman, at the point of purchase, and wherein the goods are most invitingly presented to consumer view.

It is still a further object of the present invention to provide a display card for eyeglasses having the advantageous characteristics mentioned in the preceding paragraphs, wherein may be provided means for selectively positively retaining the eyeglasses against removal from the card and for releasing the eyeglasses for convenient removal from the card, which selective retention means serves admirably to maintain the carded eyeglasses against damage during shipment, storage and handling of the merchandise, as well as to prevent pilfering at the point of purchase, or to permit quick and easy customer removal, as may be desired under the circumstances.

It is still a further object of the present invention to provide a display card for eyeglasses which is extremely simple in construction, economical to produce and assemble with the goods, durable and attractive throughout a long useful life, and which can be inexpensively manufactured from relatively inexpensive sheet stock, such as cardboard or the like.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a plan view showing a blank adapted to be formed into the display card of the present invention;

FIGURE 2 is a blank adapted to serve as a retainer for positively retaining eyeglasses on the instant display card;

FIGURE 3 is a perspective view showing a display card of the present invention, a plurality of eyeglasses carried thereby, and illustrating the retainers in operative association with the assembled card and eyeglasses;

FIGURE 4 is an enlarged, fragmentary perspective view showing in greater detail the cooperative association between the instant display card, retainer and a pair of eyeglasses on display;

FIGURE 5 is a partial vertical sectional view taken substantially along the line 5—5 of FIGURE 3; and FIGURE 6 is a horizontal sectional view taken substantially along the line 6—6 of FIGURE 3.

Referring now more particularly to the drawings, and specifically to FIGURE 1 thereof, a blank is there generally designated 10 and may be fabricated of a single sheet of stiff card material, such as cardboard, or the like. The sheet or card 10 may be of generally rectangular-outline configuration, including a lower edge 11, a pair of side edges 12 extending in parallelism with each other and normal to the lower edge, and an upper edge 13 which may be contoured for visual attractiveness, as desired. A fold line or score 15 may extend between the lower and upper edges 11 and 12 of the card 10, spaced approximately equal between and parallel to the side edges 12. The fold line or score 15 is preferably formed or cut to facilitate rearward folding of the medial card region, so as to form an interior dihedral angle along the fold on the forward side of the card, which is visible in FIGURE 1.

Extending in parallelism with and spaced between each side edge 11 and the fold or score 15 is formed an additional fold line or score 16. Thus, a pair of fold lines or scores 16 are formed on the sheet or card 10, each located medially between the central score 15 and a respective side edge 12, being longitudinally coextensive with the card and terminating at the lower and upper card edges 11 and 13. The score lines or folds 16 may be formed on the forward side of the card 10 to facilitate forward folding, thereby defining an external dihedral angle at each fold line 16.

Thus, the card or sheet 10 is subdivided into a pair of contiguous, side-by-side inner panels 18, each being defined between the fold 15, edges 11 and 13, and a respective fold 16. Also, a pair of outer panels 19 are each defined between a respective fold 16, the adjacent outer edge 12, and the edges 11 and 13.

A plurality of generally inverted, U-shaped openings 20 are also formed in the card or sheet 10. Specifically, a plurality of the inverted U-shaped openings 20 are formed in spaced, vertical alignment with each other in each adjacent pair of panels 18 and 19, with each through opening located symmetrically with respect to the adjacent fold line or score 16. Thus, each through opening 20 includes a bight region 21 extending laterally across its adjacent score 16, and a pair of laterally spaced depending regions or legs 22 spaced on opposite sides of the adjacent score 16. Further, each through opening 20, by its inverted U-shaped configuration, serves to define an upstanding ear 23 of the card region between the leg regions 22. The ears 23 defined by the openings 20 are each located symmetrically with respect to a fold line or crease 16, being bisected by the latter, and may be considered as extending upward to and terminating at the bight region 21 of the respective opening 20. It will also be observed that the leg regions 22 of the openings 20 are each inwardly enlarged, as at 24, to define undercuts on the side edges of each ear 23.

The card or sheet 10 illustrates two series of vertically aligned through openings 20, each being formed in a pair of panels 18 and 19 connected together by a fold line 16, and it is appreciated that a greater or lesser number of such series of openings and pairs of panels may be employed, if desired.

In FIGURE 2 is shown a retainer, generally designated 30, which may also be fabricated of a single piece of sheet material, such as cardboard or the like, and includes a relatively long stem part 31 at one end of which is provided a transverse cross part 32.

In the assembly of FIGURE 3, the card or sheet 10 has been bent rearwardly along the medially located, vertically extending fold or crease 15, and has been bent forwardly along the vertically extending pair of folds or creases 16 spaced on opposite sides of the medial bend 15. In this condition, the card 10 may be suspended from a wall hanger, or supported from below, or otherwise, as desired.

It will be noted that the folds or bends 16 each pass centrally through a vertically aligned row of inverted U-shaped openings 20. Thus, by the vertically extending forward bends 16, the leg regions 22 of each opening 20 are offset horizontally rearward from the ear portion 23 between the respective leg regions. Viewed otherwise, the ear 23 associated with each opening 20 is offset horizontally forward with respect to the adjacent leg regions 22 by formation of the bends 16. Further, the undercut region 24 in the lower portion of each leg region 22 extends forward into the side edge of the adjacent ear 23.

It will also be observed in FIGURE 3, that several pairs of eyeglasses 35 are shown carried by the display card 10, one pair of glasses 36 having just been removed from the display card.

In FIGURE 4 the operative association of the eyeglass temples 36 with the card 10 is illustrated in greater detail. It will there be seen that the temples 36 extend in their longitudinal relationship on the rearward side of an ear 23, crossing transversely of and behind the forward bend 16, and extend forward and outward through both leg regions 22 of the opening 20. The temples are received in the lower portions of the leg regions 22 and engage in the forwardly undercut regions 24, for purposes appearing presently. The eyeglass front has been omitted in FIGURE 4 to more clearly illustrate the location of the temples 36 in an opening 20.

The condition of FIGURE 4 is further illustrated in FIGURE 5, the temples 36 being shown on the rearward side of forwardly bent ear 23 and engaged in the forwardly undercut portions 24 of the leg regions 22. Further, the eyeglass front 37 extends laterally across the forward side of the ear 23 having its bridge 38, or other region, in engagement with the forward side of the ear. This engagement of the eyeglass front with the forward side of ear 23 insures proper location of the temples 36 in the undercuts 24, which in turn resist inadvertent upward movement of the eyeglasses relative to the openings 20. The engagement of the eyeglass front 37 with the forward side of ear 23 is further illustrated in FIGURE 6.

In addition, a retainer 30 may have its elongate part 31 extending vertically on the rearward side of the card 10, received in the rearwardly facing internal dihedral angle defined by the forward bend 16 and extend across the bight regions 21 of the several vertically aligned openings 20. Thus, a single retainer 30 serves as a barrier to close or prevent withdrawal of eyeglasses from the several vertically aligned openings 20.

Upon removal of a retainer 30, as by upward withdrawal thereof, see the lower opening 20 in FIGURE 5, it is then possible to readily remove a pair of eyeglasses, as by merely raising the latter to place the temples 36 in the bight region 21 of the opening 20 and forward withdrawal of the glasses, the temples passing over the ear 23. Of course, the glasses may, with equal simplicity, be returned to their position on the card 10 by engagement of the temples in the bight region 21 and moving the glasses downward to engage the temples in the leg regions 22. In removal and replacement of glasses from the openings 20, slight resilient deflection of the glasses or ear 23 is necessary, as the temples 36 are resiliently held forward in the cutouts 24 by forward engagement of the ear 23 with the eyeglass front 37. This resilient retention of glasses in the openings 20 effectively resists accidental dislodgment or removal of glasses from the openings. Of course, removal of the eyeglasses may be positively prevented by insertion of the retainers 30 in vertical disposition across the several vertically aligned openings 20 between the ears 23 and temples 36. Use of the retainers 30 in this condition is highly desirable during shipment, storage and handling of the merchandise prior to ultimate sale; and, the retainers may be quickly and easily removed from the display card to permit convenient self-service removal of glasses from the card at the point of purchase. The upper-end crosspiece 32 of each retainer 30 serves both as a convenient manual-grasping portion or handle, and also frictionally engages with the rear surfaces of panels 18 and 19 to removably hold the retainer in position.

From the foregoing, it is seen that the present invention provides a display card for eyeglasses which fully accomplishes its intended objects and is well-adapted to meet practical conditions of manufacture, distribution and use.

Although the present invention has been described in some detail by way of illustration and example for purposes of clarity of understanding, it is understood that certain changes and modifications may be made within the spirit of the invention and scope of the appended claims.

What is claimed is:

1. A merchandising display comprising a card adapted to be supported in generally vertical disposition, said card being formed with a plurality of spaced vertically aligned through openings each of generally inverted U-shape having an upper bight region and a pair of depending laterally spaced leg regions defining therebetween an upstanding ear, said card being provided with a forward bend along a vertical region extending between said leg regions to offset said ears horizontally forward of said leg regions, and a plurality of pairs of eyeglasses each having its front extending laterally across and frictionally engaging a respective ear on the forward side thereof and its temples extending laterally through the legs of the adjacent opening on the rearward side of and frictionally engaging said ear, said eyeglasses being removable by upward movement to pass said temples over the adjacent ear and forward through the bight region of the receiving opening.

2. A display according to claim 1, in combination with a retaining member removably disposed on the rear side of said ears and extending generally vertically across the bight regions of all of said openings to prevent removal of eyeglasses from said openings.

3. A display for eyeglasses according to claim 1, the legs of each of said openings being undercut forward for resilient retention of said temples.

4. A display for eyeglasses according to claim 3, said bend being defined by a vertically extending fold engageable with the bridge of each pair of eyeglasses received in said openings to center the eyeglasses and urge the latter forward to retain said temples in the undercut regions of said openings.

References Cited in the file of this patent

UNITED STATES PATENTS

| | | |
|---|---|---|
| 615,702 | Hills | Dec. 13, 1898 |
| 732,828 | Christopher | July 7, 1903 |
| 2,914,168 | Crane | Nov. 24, 1959 |